Jan. 31, 1939.   P. WANGEMANN   2,145,468
CIRCUIT BREAKER
Filed May 1, 1936
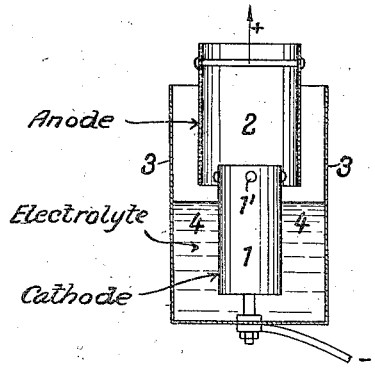
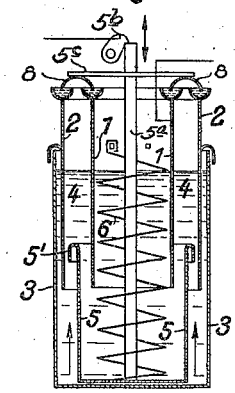
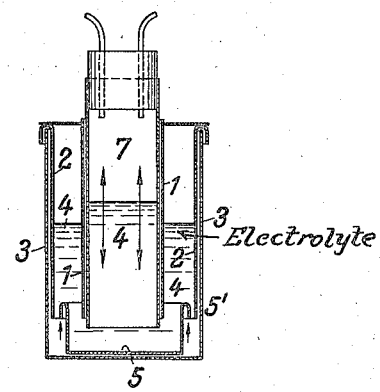
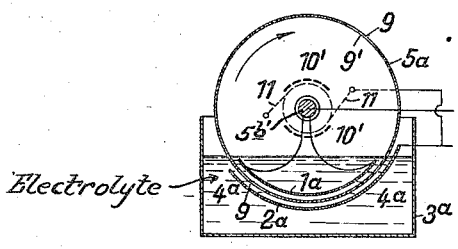
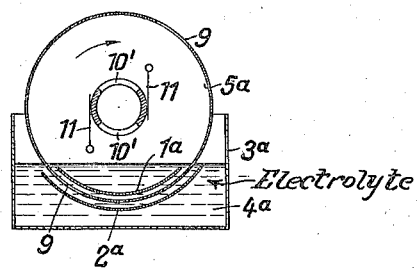
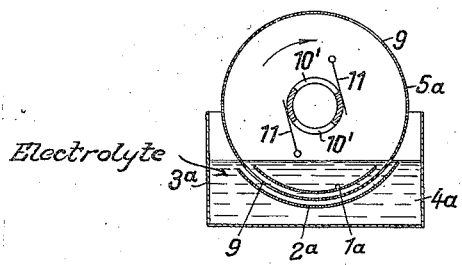
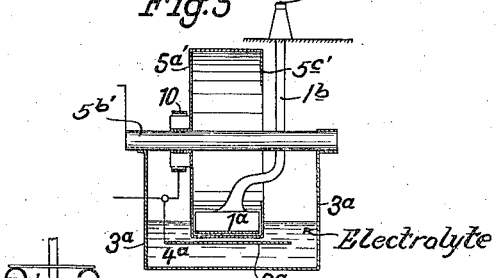
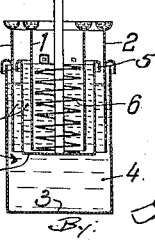
Inventor:
P. Wangemann
Glascock Downing & Seebold
Attys.

Patented Jan. 31, 1939

2,145,468

UNITED STATES PATENT OFFICE 2,145,468

CIRCUIT BREAKER

Paul Wangemann, Berlin, Germany

Application May 1, 1936, Serial No. 77,445
In Germany December 23, 1935

12 Claims. (Cl. 200—152)

This application is a continuation-in-part of applicant's application S. N. 2,131 filed January 16, 1935.

This invention relates to circuit breakers and has for an object to provide improved constructions for the sparkless making and breaking of circuits carrying very high currents.

A further object is to provide improved means for this purpose in which electrodes are immersed in a conductor of the second class, such as an electrolyte.

It has been discovered that sparkless interruption of currents can best be effected when the cathode remains immersed in the highly conductive electrolyte at the moment when interruption occurs, and it is thus another object of the invention to provide an improved electrolytic circuit breaker in which the cathode remains immersed in the electrolyte at the moment of interruption.

Since in alternating current circuits it is not possible to foretell which of the two electrodes will be the cathode at the instant of interruption, special constructions are necessary. It is, therefore, a further object of the present invention to provide such an improved circuit breaker in which means are provided to assure that the electrode which at the instant of interruption is the cathode, is immersed in the liquid at the instant of interruption.

Another object is to provide circuit making means in which a circuit is first established through an electrolyte or other second class conductor and then a parallel circuit is established through a metallic connection, i. e., a conductor of the first class, and in which the circuit is interrupted first by breaking said shunt metallic circuit and then by breaking the circuit through the second class conductor.

A further object is the provision of a process of making and breaking circuits as herein described and claimed.

Further objects and advantages of this invention will be apparent from consideration of the specification as illustrated by the accompanying drawing of possible embodiments of the invention, in which drawing:

Fig. 1 shows, in vertical section, one possible form of circuit breaker suitable for practicing the invention, suitable for use in a direct current circuit.

Fig. 2 shows, in vertical section, a modified form of the invention for use in either a direct current or an alternating current circuit, in which the circuit is broken by the interposition of an insulating shield between the electrodes.

Fig. 2a shows the device of Fig. 2 in open circuit position.

Fig. 3 shows in vertical section a further modification suitable for use with either direct or alternating current, in which the circuit is broken by the partial removal of the electrolyte from between the electrodes and the interposition of an insulating shield.

Fig. 4 shows a vertical sectional view of a modification utilizing a rotating insulating cylinder.

Fig. 4a and Fig. 4b are views corresponding to Fig. 4 but showing in different positions of adjustment the brushes forming a part of the device shown in Fig. 4.

Fig. 5 is a vertical sectional view of a slightly modified device of Fig. 4 taken at right angles to the section of Fig 4.

Referring to Fig. 1 of said drawing, the numeral 3 represents a suitable vessel, preferably made of insulating material, and which contains a suitable conductor of the second class such as the highly conductive electrolyte 4 which may be a strong solution of KOH as described in British patents to Martin Paul and Paul Wangemann (the present applicant) Nos. 331,852 and 333,022. Within said electrolyte is shown the fixed electrode 1. The movable electrode 2 is shown elevated out of the electrolyte. To close the circuit the electrode 2 may by suitable means, be moved down into the electrolyte, at which time the circuit will be closed through the conductor shown connected to the electrode 1, the second class conductor 4, the electrode 2, and through a suitable conductor (not shown) connected to the electrode 2. In order to prevent possible metallic contact between the electrodes, suitable insulating means may be provided such as the insulating knobs 1' on electrode 1.

In order that the form shown in Fig. 1 will operate in accordance with the present invention it was found that the electrode 1 must be the cathode to assure dependable sparkless interruption of heavy currents. An explanation of this phenomenon is not necessary here, but it may be stated that since the cathode remains immersed no cathode spot is formed and that therefore, the formation of an arc is prevented.

Figs. 2 and 2a illustrate a circuit breaker adapted for alternating current. As it is impossible to determine which electrode will be the cathode at the instant of interruption, it was found necessary to so construct the circuit breaker for alternating current that neither electrode is withdrawn from the electrolyte. In this construction, the container 3 is substantially filled with the electrolyte 4. Continuously immersed within the electrolyte are the two electrodes 1 and 2, shown in the form of cylinders. Neither one of these electrodes is moving during the circuit making or breaking operation. Also located within the electrolyte is a cup or the like 5, made of insulating material. The cup is mounted for vertical movement so that when it is lifted from the position shown in Fig. 2 to the position shown in Fig. 2a, it will progressively interrupt the circuit between the electrodes 1 and 2 and when the upper edge of cup 2 emerges from the electrolyte, the circuit will be entirely broken, the break occurring while a substantial surface of each electrode is submerged, so that extremely high current density on the electrode surface is avoided.

For the purpose of securing the desired vertical movement of cup 5, it may be carried by a rod 5a and normally tensioned spring 6 may be provided to move the insulating cup 5 upwardly when the holding pawl 5b is released. The upper edge of the cup 5 is preferably provided with an air trap to prevent creeping current immediately after the circuit is broken. This may be easily accomplished by having the top edge of the cup turned back upon itself, as shown at 5'. Air will be trapped within the annular space, as a result of which the surface within the trap will remain dry, thus precluding the possibility of creeping currents.

It has been found desirable also to provide a shunt or bridging contact, preferably of a metallic nature. This may be accomplished by providing an arm or disk 5c upon the rod 5a and forming upon said arm or disk a suitable bridging conductor 8 which makes metallic contact with electrodes 1 and 2.

With this construction it will be noted that when the cup is moved upwardly, the shunt circuit, through the metallic switch, will first be broken, whereupon all of the current is caused to flow through the electrolyte 4, between the electrodes 1 and 2. Upon further rising of the cup 5, the electrolytic path is gradually cut off until the top edge of the cup 5 emerges from the electrolyte. As soon as the skirt member 5' has emerged from the electrolyte, the dry surface within the air trap will prevent also the flow of creeping currents.

It will be seen, therefore, that this form of the invention provides electrodes immersed in an electrolyte together with means for breaking the circuit between said electrodes through said electrolyte without withdrawing either electrode from the electrolyte, whereby it is assured that the electrode which, at the instant of interruption is the cathode, is certain to be immersed in the electrolyte at the instant of interruption; and in which an electrode bridging metallic switch member is provided to close a metallic shunt circuit after the closing of the circuit through the electrolyte and for breaking the metallic shunt circuit prior to the interruption of the current through the electrolyte.

In the form shown in Fig. 3, the electrodes 1 and 2 are shown immersed in electrolyte 4 contained in receptacle 3. Concentrically with said electrodes is arranged a tubular chamber 7 substantially closed at the top and provided with means for altering the air pressure within said chamber above the electrolyte 4. It will be seen that when the air pressure is reduced a large part of the electrolyte will flow up into the chamber 7 and therefore flow away from the space between the electrodes until the circuit is broken at the instant when the top surface of the electrolyte becomes lower than the top edge of the insulating cup 5 which, again, is preferably provided with an air trap 5'. In the form shown, it will be seen that the circuit breaking action will be expedited by the floating of the cup 5 as soon as the liquid level therein drops below its top edge. It will be noted that the lower ends of the electrodes 1 and 2 remain covered to a substantial extent by the electrolyte and that therefore extremely high current densities upon the electrode surfaces are avoided.

Figs. 4, 4a, 4b, and 5 illustrate a circuit breaker of the rotary type operating in accordance with the present invention. Such a device may be used not only in the usual manner as a circuit breaker for producing single interruptions, but also for use as controllers, mechanical rectifiers, etc. In these figures, as in the construction shown in Figs. 2 and 2a, the electrodes 1a and 2a are continuously immersed in the electrolyte and the electrolytic path between them is interrupted as required on occasion by passing an insulating shield therebetween. The electrolyte 4a is contained in a receptacle 3a and the electrode 2a, at least one side of which is curved, is firmly supported within said receptacle by any suitable insulated means. The electrode 1a, the outer face of which is correspondingly curved, is also firmly supported within the electrolyte by suitable insulated means such as by suspending it from the shaft 5b as shown in Fig. 4 or supporting it upon an insulated support as the bracket 1b (Fig. 5). The insulating shield may consist of a drum 5a having one cylindrical wall 5a' attached to and carried by the shaft 5b' appropriately journaled relative to the electrodes. The cylindrical wall of said drum is provided with one or more openings 9 to provide a conducting path, as required from time to time, between the electrodes 1a, 2a, through the electrolyte 4a. Attached to the outer free end of the cylindrical wall is an inwardly extending flange portion 5c' to complete the interruption of the path through the electrolyte. The slots 9 may, if desired, be closed by means of a metal plate to prevent undue agitation of the electrolyte which might otherwise occur at high rotational speeds.

In order to provide a shunt metallic switch, it may be desirable to provide a commutator, such as the metallic segments 10', which rotate as a unit with the insulating drum shield 5a and are engaged by brushes 11, preferably mounted for rotative adjustment relative to the commutator segments.

By adjusting the brushes to the position shown in Fig. 4b and connecting them in the circuit controlled by the circuit breaker as shown in Fig. 4, a short circuiting device substantially equivalent to that designated at 8 in Fig. 2 is provided. According to this adjustment, during the movement of the drum 5a through the angular distance corresponding to the position in which the slot 9 enters and leaves the electrolyte, the flow of current from one electrode to the other is through said electrolyte. The brushes may be so adjusted, that before the slot emerges from the electrolyte, the arcuate segment 10' disengages from the brush 11 and current flows for a moment only through the electrolyte and is then sparklessly interrupted as the slot emerges from the electrolyte and remains interrupted until it is re-established either by the metallic switch or by the entry of a slot 9 into the electrolyte.

In other positions of adjustment of the brushes, the variation of the circuit closing period during each revolution of the insulating drum may be varied but in all instances the adjustment is such that the interruption in the flow of current occurs at the electrolyte, that is to say, the flow of current is interrupted by the slot 9 of the drum emerging from the electrolyte, the brushes 11 at the moment engaging insulating parts of the commutator.

With the brushes 11 adjusted as shown in Fig. 4, the duration of the circuit closing period is relatively short but as the commutator the closing period is reduced. As will be understood, the "periods" during which the circuit is closed are compared in duration to the complete revolution of the drum. Actually, of course, the length of these periods depend on the speed at which the drum revolves but the adjustment of the brushes may be so varied as to change the length of the circuit closing periods during each revolution of the drum. It is evident that the circuit breaker can be used for the spasmodic regulation of the intensity of the current, for the purpose of starting motors without consuming energy in resistances in accordance with the usual practice.

If the forms of the invention shown in Figs. 2, 2a, 3, 4, 4a, 4b and 5 are used in an alternating current circuit either electrode will alternately be the cathode. If used for direct current, one of the electrodes will be the cathode permanently.

Fig. 6 shows schematicaly how a circuit breaker made according to the present invention (particularly Figs. 4, 4a, 4b and 5) may desirably be used in interrupting a six phase current. By this arrangement a separate interrupter is provided for each phase which has been found desirable. The reference numerals 3a indicate the vessel 3a of Figs. 4, 4a, 4b or 5, or the equivalent. The leads from the several interrupters are connected together and form the common conductor C. If the shaft 5b which is common to the interrupters is rotating in synchronism with the polyphase alternating current the arrangement shown may be used as a rectifier by so adjusting the several circuit breakers as to interrupt their respective phase circuits at such times that direct current will flow in conductor C.

Whenever the expression, "electrolye" or "highly conductive electrolyte," is used herein it is to be understood as indicating an electrolyte having a relatively low specific resistance such as the KOH solution described in said British Patents 331,852 and 333,022, or the equivalent thereof, or, in other words, an electrolyte in which less resistance is offered to the migration of the ions through the electrolyte than to the migration of the electrons in the arc which might otherwise form in parallel with the electrodes.

It will be noted that the construction shown and described will serve admirably to accomplish the objects stated above. It is to be understood, however, that the constructions disclosed above are intended merely as illustrative of the invention as defined by a proper interpretation of the claims which follow.

What I claim is:

1. An interrupter for heavy electric currents, comprising a vessel, a second class conductor therein, electrodes stationarily immersed in said second class conductor, means for preventing metallic connection between the said electrodes within the said second class conductor, a movable insulating wall adapted to be moved between the said electrodes and an insulating air trap formed on the edge of the insulating wall.

2. An interrupter for heavy electric currents, comprising, a vessel, a second class conductor therein, electrodes stationarily immersed in said second class conductor, means for preventing metallic connection between the said electrodes within the said second class conductor, a movable insulating wall adapted to be moved between the said electrodes, and means adapted to prevent the flow of creeping current over the edge of the insulating wall.

3. An interrupter for heavy electric currents, comprising a vessel, a second class conductor therein, electrodes stationarily immersed in said second class conductor, means for preventing metallic connection between the said electrodes within the said second class conductor, a rotatable insulating wall between the electrodes, means for producing a first class conductor shunt connection in parallel with and outside of the second class conductor rotating in synchronism with the said rotatable insulating wall 4. An interrupter for heavy electric currents, comprising a vessel, a second class conductor therein, electrodes stationarily immersed in said second class conductor, means for preventing metallic connection between the said electrodes within the said second class conductor, a rotatable insulating wall between the electrodes, means for producing a first class conductor shunt connection in parallel with and outside of the second class conductor rotating in synchronism with the said rotatable insulating wall, said first class conductor shunt means consisting of at least one metallic segment and a brush cooperating therewith.

5. An interrupter for heavy electric currents, comprising a vessel, a second class conductor therein, electrodes stationarily immersed in said second class conductor, means for preventing metallic connection between the said electrodes within the said second class conductor, a rotatable insulating wall between the electrodes, means for producing a first class conductor shunt connection in parallel with and outside of the second class conductor rotating in synchronism with the said rotatable insulating wall, said first class conducting shunt means consisting of at least one metallic segment and a rotarily adjusting brush cooperating therewith.

6. A circuit breaker for interrupting heavy currents comprising a vessel, a highly conductive electrolyte therein, electrodes stationarily supported within said electrolyte normally electroconductively connected through said electrolyte, a rotatably mounted shield of insulating material between said electrodes for interrupting the electrolyte path therebetween, means to prevent metallic connection between said electrodes within said electrolyte, and a metallic contact device arranged outside said electrolyte rotating with said rotary shield to normally provide a shunt circuit between said electrodes and to sparklessly break said shunt circuit immediately before the electrolyte circuit between said electrodes is broken.

7. A circuit breaker as claimed in the preceding claim in which said metallic contact device comprises at least one metallic segment rotating with said shield and a brush cooperating therewith, and means for rotarily adjusting said brush.

8. An interrupter for heavy electric currents, comprising a vessel, a highly conductive electrolyte therein, electrodes stationarily immersed in said electrolyte and a movable insulating wall adapted to be moved between the said electrodes, said electrodes comprising concentric cylinders and said insulating wall comprising a cylindrical cup.

9. An interrupter for heavy electric currents, comprising a vessel, a highly conductive electrolyte therein, electrodes stationarily immersed in said electrolyte and a movable insulating wall adapted to be moved between the said electrodes, said electrodes comprising concentric cylinders and said insulating wall comprising a cylindrical cup adapted to be interposed between said electrodes in such a manner that its upper edge emerges from the electrolyte.

10. An interrupter for heavy electric currents, comprising a vessel, a highly conductive electrolyte therein, electrodes stationarily immersed in said electrolyte and a movable insulating wall adapted to be moved between the said electrodes, said electrodes comprising concentric cylinders and said insulating wall being formed as a cylindrical cup.

11. An interrupter for heavy electric currents, comprising a vessel, a highly conductive electrolyte therein, electrodes stationarily immersed in said electrolyte and a movable insulating wall adapted to be moved between the said electrodes, said electrodes comprising concentric cylinders and said insulating wall comprising a cylindrical cup adapted to be interposed between said electrodes, said cup being formed with means to prevent the passage of creeping currents over the edge of said cup.

12. An interrupter in accordance with claim 10 wherein there is provided a normally biased spring adapted when released to interpose said cup between said electrodes.

PAUL WANGEMANN.